Sept. 29, 1959    W. H. HAMMER ET AL    2,906,584
DATA RECORDING CAMERA
Filed March 6, 1956    4 Sheets-Sheet 1

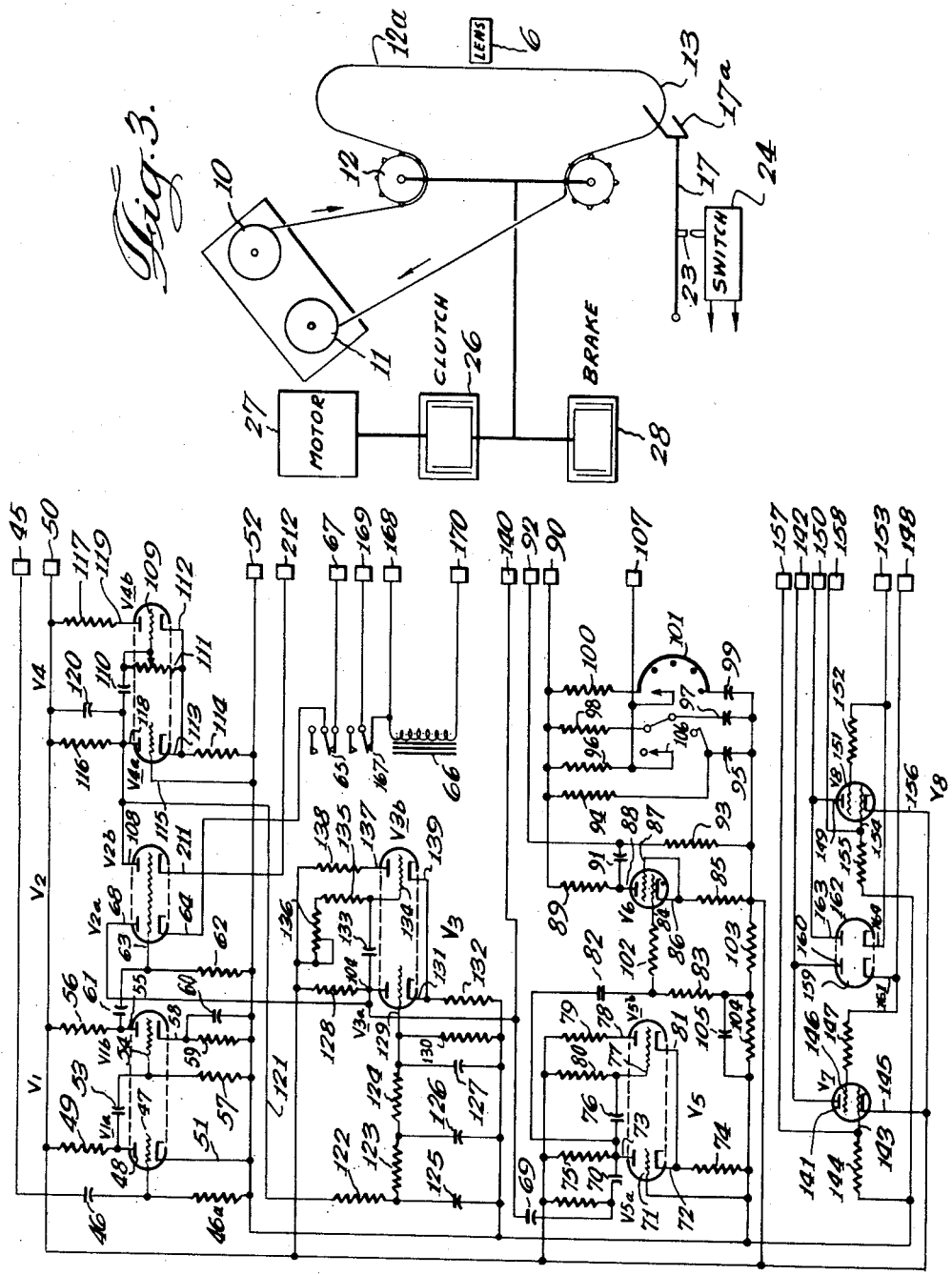

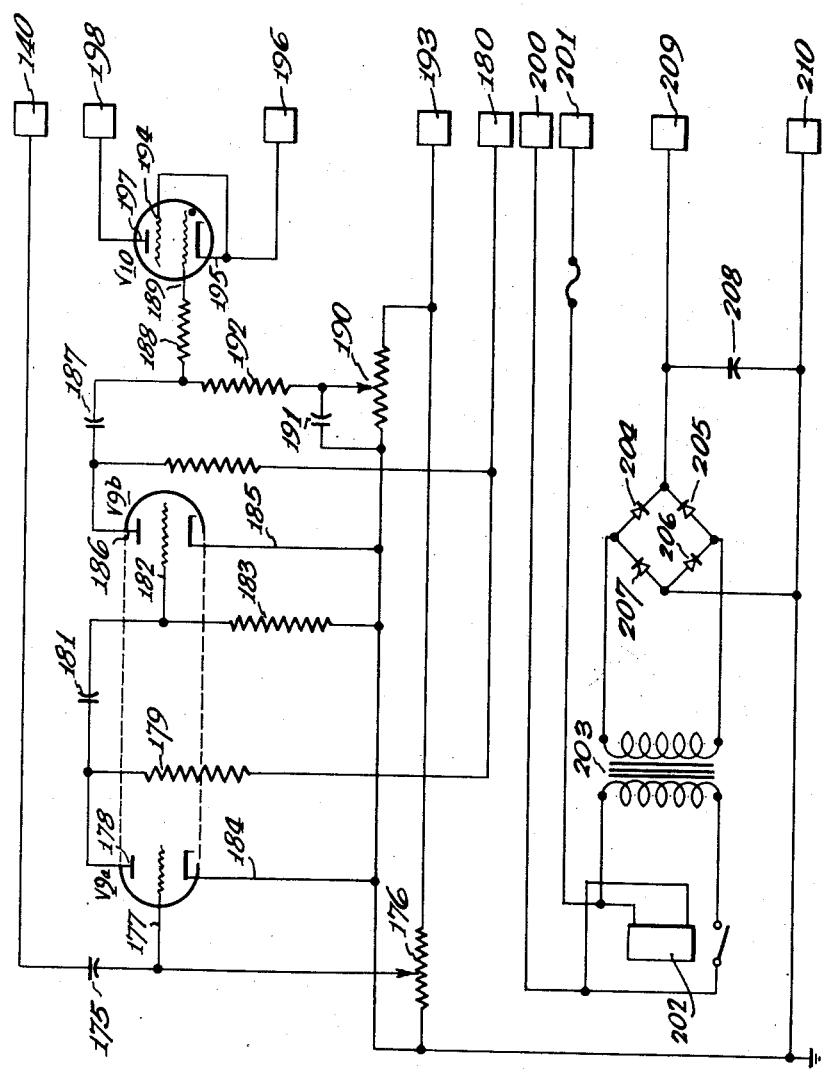

United States Patent Office 2,906,584
Patented Sept. 29, 1959

2,906,584

DATA RECORDING CAMERA

Warren H. Hammer, Alamogordo, N. Mex., and Lloyd K. Loomer, Hayward, Calif., assignors to Land-Air, Inc., a corporation of Illinois Application March 6, 1956, Serial No. 569,719

19 Claims. (Cl. 346—110)

This invention relates to data recording cameras and more particularly to electrical systems for controlling the operation of such cameras.

In the prior art, shutterless cameras are known in which a continuously moving strip of film is exposed by traversing a narrow transverse slot or the focal plane of the lens system of the camera. Such a camera advantageously may be utilized, for example, to record data displayed on the face of a cathode ray tube.

In many applications of cathode ray tube indicating devices, the nature of the information displayed is such that the time interval between successive traces varies in accordance with characteristics of the data to be recorded. Thus, it frequently happens that the information to be displayed may be received by the cathode ray device at a rate which is irregular and varying. Manifestly, in the interest of efficient recording and to avoid film waste, it is desirable in such applications that the exposure rate of the camera be synchronized with the non-uniform and varying rate of the cathode ray tube information. Satisfactory results toward this end have not been achieved with prior art cine-type of film drive systems inasmuch as the latter normally cannot be adapted to advance the film at variable desired rates. Some of the difficulties which are presented by a variable drive system include the problem of making the film pull-down mechanism responsive to the irregular synchronizing pulses and the problem of maintaining the film loops above and below the exposing device at a desired size to provide sufficient film at the rate of the input signal and thereby avoid film breakage. A further problem in this type of recording system is presented by the mechanical inertial delay which exists between the electrical pulse to the pull-down device and the actual start of film pull-down.

Therefore, it is an object of this invention to provide a camera capable of recording data at a non-uniform and varying rate.

It is a further object of this invention to provide a camera having improved exposure control circuits responsive to irregular synchronized impulses from a cathode ray display.

It is a still further object of this invention to provide improved circuit means for controlling the transport of film through a film gate in single frame intervals and at irregular transport times.

It is a still further object of this invention to provide a camera having improved means for maintaining the size of the film loops within the camera.

It is another object of this invention to provide in a camera wherein the exposure is controlled by varying electrical impulses an improved means for compensating for mechanical inertial delay between the synchronizing impulses and the film pull-down.

These and other objects are realized in a specific illustrative embodiment of the invention in which a shutterless camera is electronically controlled by a blanking impulse from a cathode ray oscilloscope to record the data displayed on the face of the oscilloscope. As such data varies at irregular and varying rates, it is necessary to move the film from the film pack through the exposing device and back into the film pack in single frame intervals and at a frame rate which similarly is irregular and varying in nature.

In accordance with a feature of this invention, this is achieved by a clutch-brake drive control system. A loop switch responsive to the size of the film loop below the exposing device is provided in the camera. When the loop is of normal size a brake control discharge device is made to operate and results in the brake on-clutch off condition. When, due to the receipt of a blanking impulse from the cathode ray device, the film pull-down mechanism advances the film one frame, the subsequent enlargement of the lower loop operates the lower loop switch to energize a clutch control discharge device and place the camera control system in the clutch on-brake off condition. The film drive sprockets are caused to operate and reduce the size of the lower loop to normal, at which time the lower loop switch is actuated back to the brake on condition. In the invention, the upper and lower drive sprockets are geared together and thus the size of the upper film loop is maintained along with the lower film loop.

In accordance with an aspect of this invention, the film pull-down mechanism comprises a solenoid responsive to the oscilloscope blanking impulse. The blanking impulse, after being amplified and shaped, triggers a thyratron which automatically pulses the pull-down solenoid. It is a feature of this invention that the solenoid is connected to breaker points that are in series with the thyratron cathode. Thus, when the solenoid pulls down to trip the next film frame advance, the breaker points open to de-ionize the thyratron and the circuit is prepared for the next cycle.

A further feature of this invention includes a signal pulse anticipation circuit which is designed to allow for the mechanical inertial delay between the signal pulse to the pull-down solenoid and the actual start of film pull-down. The anticipation circuit comprises a pair of multivibrators and a rate integrator circuit which combine to form a negative square wave that appears at a desired period of time in advance of the next input signal.

The above and other various features of novelty which characterize the invention are pointed out with particularity in the claims annexed to and forming a part of this specification. For a better understanding of the invention, however, its advantages and the specific objects attained with its use, reference is had to the accompanying drawings and descriptive matter in which is shown and described an illustrative embodiment of the invention.

In the drawings:

Figure 3 is a diagrammatic view of the film transport mechanism of the invention;

Figure 4 is a schematic representation of the electronic camera control circuits; and Figure 5 is a schematic representation of the pulse unit comprising the pull-down solenoid control circuit and power supply.

Figure 1:
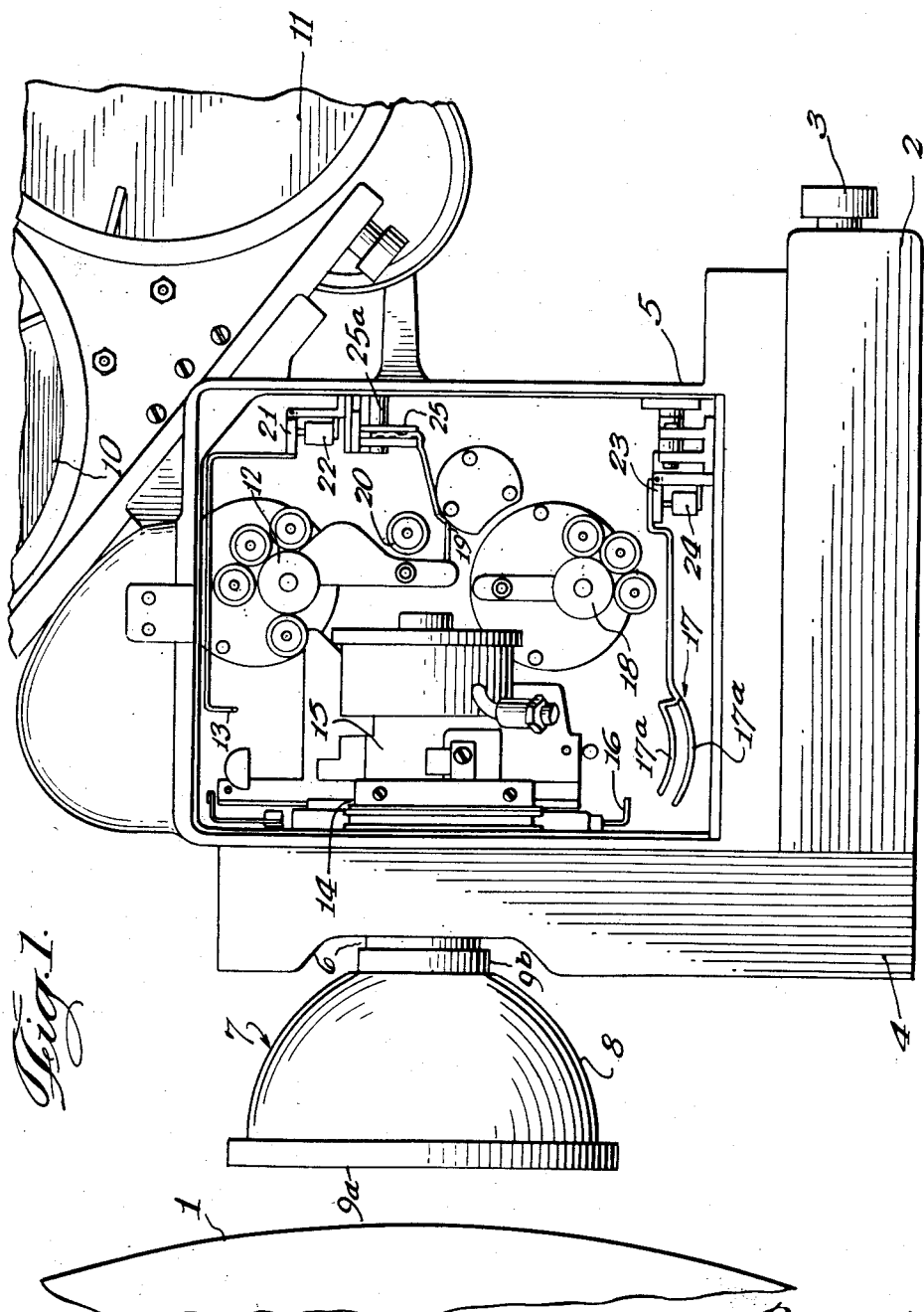
Figure 1 is a side elevational view of a camera structure in accordance with the invention.

Referring now to Figure 1, there is shown a side view of the camera body which includes the film transport mechanism, the loop switches and the film optics. The data to be recorded by the camera is displayed on the face of the cathode ray tube 1. The camera is brought into cooperative relationship with cathode ray tube 1 by means of a rackover base assembly 2. Extending from the rear of the rackover base assembly 2 is a handle 3 which may be turned to actuate any desirable traverse mechanism (not shown) within the base assembly to properly position the camera lens with respect to the cathode ray display.

The camera optics, including the main objective lens 6, advantageously may be located within a housing 4 positioned in front of the camera body 5 and the rackover base assembly 2. Preferably, a lens hood 7 is placed between the lens and the oscilloscope to prevent extraneous light from reaching the camera film during exposure.

In accordance with an aspect of this invention, lens hood 7 comprises a concave rubber cup 8 having an adaptor ring 9a on its large end which fits the flange in front of oscilloscope 1. At the small end of lens hood 7 is a clamp ring 9b which secures the hood to lens 6.

Positioned above camera body 5 are two film magazines 10 and 11 which accommodate the loading spool and the take-up spool, respectively. Unexposed film from magazine 10 enters camera body 5, passes around the upper sprocket 12, forms a loop over the upper loop detection switch 13, passes through film gate 14 and the film pull-down mechanism 15, which includes a pull-down solenoid responsive to input signal pulses and an intermittent movement controlled by the actuation of the pull-down solenoid, passes by guide 16, forms a loop sandwiched by the lower loop detection switch 17 defined by wires 17a and passes around a lower sprocket 18 through a film end detector switch 19 and exits along guide roller 20 into the take-up spool of film magazine 11.

The film from magazine 10 is advanced through film gate 14 in single frame intervals and at irregular transport times as determined by the input signal pulses to the pull-down solenoid.

This may be brought about by the intermittent movement in the film pull-down mechanism which advantageously comprises a spring motor drive whereby a clock type spring is held in a wound condition by a constant drive source connected thereto by a friction clutch, and is released upon energization of the pull-down solenoid to drive the film transport shuttle.

In accordance with aspects of this invention as explained below in greater detail, the upper and lower film loops are maintained to desired sizes by operation of the upper and lower loop detection switches 13 and 17, respectively. The upper loop detection switch 13 is connected to a rocker arm 21 positioned directly above a small pressure switch 22. Switch 22 controls the operation of the pull-down solenoid in the event the upper film loop gets small enough to create the possibility of film breakage. Thus, if the upper film loop gets short enough to touch the wire structure of the detection switch 13, the wire structure is depressed and actuates switch 22 which interrupts the pulsing of the solenoid until upper sprocket 12 feeds enough film into the camera body 5 to release switch 22.

In a somewhat similar manner, lower loop detection switch 17 guards against the possibility of film breakage by maintaining the size of the lower film loop. Thus, when the size of the lower film loop increases due to the rate at which the intermittent movement feeds it, the wire structure of the switch 17 follows the film and depresses rocker arm 23 to actuate switch 24. Switch 24 in its normal position actuates a brake. In its depressed position, the switch 24 actuates a clutch which causes the sprockets to rotate and adjust the film loops by lengthening the upper loop and shortening the lower loop.

This action is shown further in Figure 3 of the drawing. Film 12a passes from the loading spool 10 past upper sprocket 12 to form the upper loop and passes the exposing device to form the lower loop and then goes through the wires 17a of the lower loop detection switch 24, and then up through the lower sprocket 18 back into the take-up spool 11. When the lower loop is of normal size, the loop switch 24 turns on brake 28 and at the same time turns off clutch 26. The pull-down of the next frame enlarges the lower loop and causes rocker arm 23 to be depressed, thereby actuating switch 24. This operation actuates the clutch and brake control circuits to cause clutch 26 to be engaged with motor 27 and drive upper and lower sprockets 12 and 18, respectively, in a direction to return both loops to their normal sizes. Upon the lower loop regaining its normal size, switch 24 is released and the clutch and brake control circuits operate to release motor 27 from clutch 26 and engage it with brake 28. As a result of this operation, the film 12a is made available to the pull-down mechanism of the camera and is taken up from the lower loop at a rate which is not constant, as is normally done by prior art devices, but which may be irregular and varying in accordance with rate of input signal.

Returning now to Figure 1, it may be seen that after leaving lower loop detection switch 17 and wires 17a and lower sprocket 18, the film 12a is passed over film end detection switch wire 19 and through exit guide roller 20, into the take up spool of the magazine. Wire structure 19 is connected to a rocker arm 25 which actuates a switch 25a. When the end of the film passes over wire 19, the latter rises and actuates switch 25a to open the main drive motor (not shown), and the electronic pulsing circuits, thereby automatically stopping the camera action.

If desired, the camera body 5 may include a section for housing a clock and a counter mechanism together with a flash lamp for illuminating the clock and counter during each exposure of the film. Thus, if such data is desired to be recorded upon each film frame, the flash lamp is connected to the electronic control circuits so as to be actuated by each signal input pulse in the manner explained below.

Figure 2:
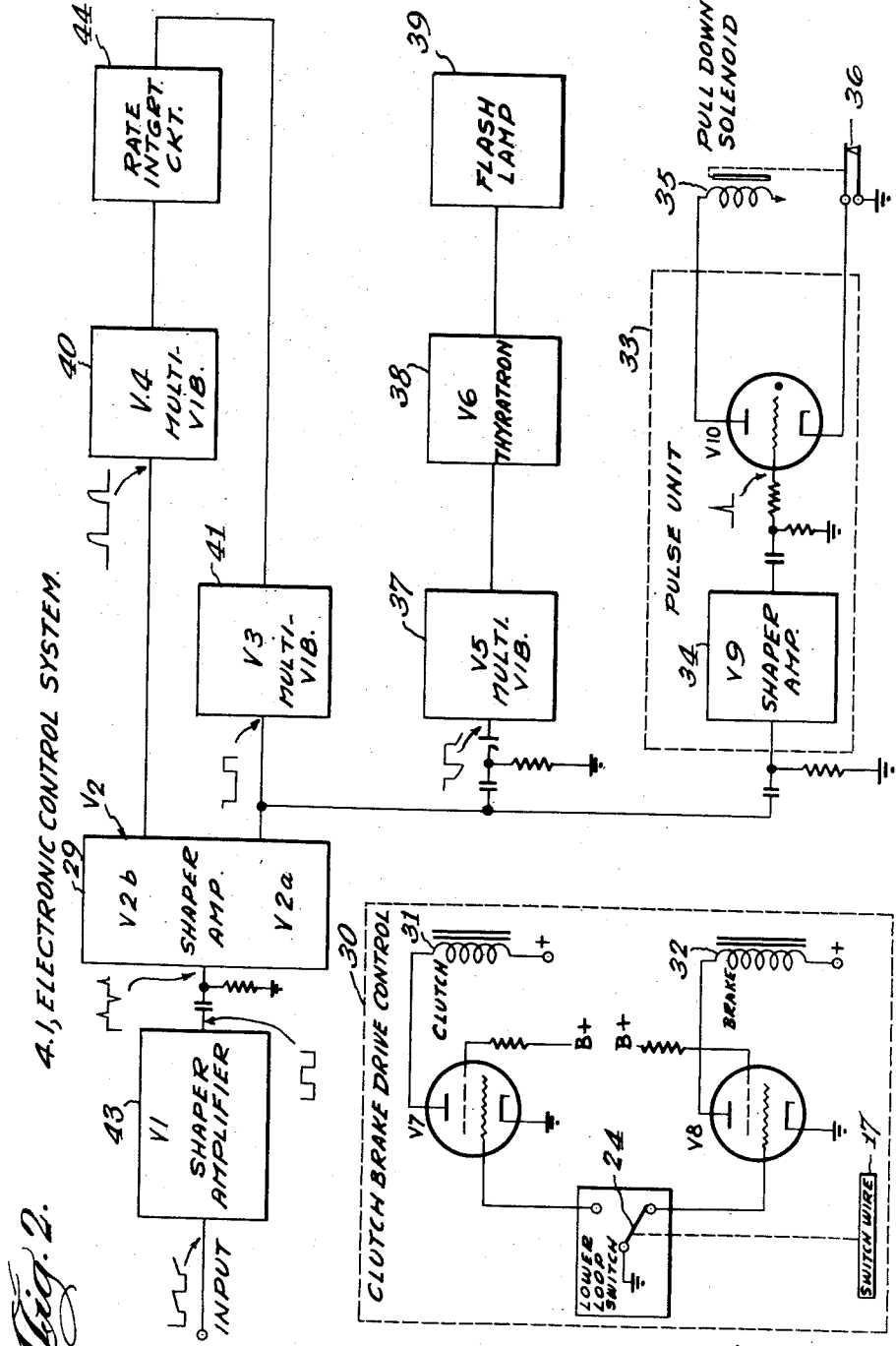
Figure 2 is a partially schematic and partially block diagrammatic view of the camera electronic control circuitry.

Turning now to the camera control electronic system, Figure 2 is a partially block and partially schematic diagram of the clutch-brake drive control circuits, the pull-down solenoid pulse circuit, the rate integration circuit and the flash lamp control circuit. A square wave input pulse signal, which advantageously may be a blanking impulse from the cathode ray oscilloscope, is applied to the shaper amplifier comprising tubes V1 and V2. The purpose of these two tubes is to shape and amplify a sharp trigger pulse from the square wave input signal. The trigger pulse in the illustrative embodiment is negative and occurs at the same time as the trailing edge of the input blanking pulse. The output of tube V2 then is used to trigger the multivibrator circuits that follow as well as the solenoid pulse circuit.

Tubes V7 and V8 are the clutch and brake control tubes, respectively. As hitherto pointed out, the function of this circuit is to provide sufficient film to the intermittent movement at a rate that is determined by the input signal. This is accomplished by alternately turning on the brake and clutch in such a manner as to maintain the lower film loop. The actual turning on of the brake and the clutch is accomplished by a loop switch in the grid circuit of the two control tubes. Normally each tube is biased below cut off. The operation of the lower loop switch 24 grounds the grid of the brake control tube V8 when a normal size film loop exists and, thus, holds the brake on and the clutch off. When the lower loop becomes too large, the operation of lower loop switch 24 grounds the grid of the clutch control tube V7 and the clutch then drives the sprockets to reduce the size of the loop to the normal condition.

The negative trigger pulse at the output of tube V2 is differentiated and is further shaped and amplified by tube V9 of pulse unit 33. The output of tube V9 will cause the thyratron V10 to ionize which then electrically pulses pull-down solenoid 35. This solenoid is mechanically connected to breaker points 36 that are in series with the thyratron cathode. When the solenoid pulls down to trip the next frame advance of the film, breaker points 36 are opened and the thyratron is then de-ionized. The circuit then is ready for the next cycle.

The purpose of the flash lamp is to illuminate the clock and the counter in the data housing at such times that the information will be recorded on each frame of the film. To do this the one-shot multivibrator V5 is triggered by the output pulse from V2. The output square wave from the multivibrator is differentiated and then applied to the grid of thyratron V6. This thyratron will fire on the positive pulse and produce a trigger pulse to flash the flash lamp. The circuit advantageously has provision for varying the intensity of the flash lamp by switching in more or less capacity in the thyratron circuit.

The blanking pulse anticipation circuit is desirable to allow for the mechanical inertial delay between the electrical pulse to pull-down solenoid 35 and the actual start of the film pull-down. The circuit that anticipates the time of the next pulse is comprised of multi-vibrators 40 and 41 and the rate integration circuit 44. These three circuits combine to form a negative square wave whose trailing edge is an adjustable period in advance of the next blanking impulse signal.

Tube V4 is a one-shot multivibrator that is triggered by the output from tube V2. The square wave output of multivibrator V4 is modified by a form shaping capacitance and then is fed to the integrator circuit 44. Here the modified square wave is integrated through a three-section resistance-capacitance filter resulting in a desired D.C. control voltage output which varies inversely with the frequency of the input signal pulses. This control voltage is applied to the grid of multivibrator 41. The duration of the square wave produced by multivibrator 41 is dependent on the setting of a potentiometer therein and the value of the D.C. control voltage applied to its grid. Since the potentiometer is set at a predetermined position, the square wave output of multivibrator 41 varies only with the variation of the D.C. control voltage. Thus, the next blanking impulse is anticipated by a desired amount and allows for the mechanical delay due to the inertia of the pull-down solenoid.

Turning now to the electronic control system in detail, Figure 4 shows the input shaping and amplifying tubes V1 and V2 each of which advantageously may be dual triodes. The input blanking signal enters the circuit at terminal 45 and passes through the capacitance 46 to the grid electrode 47 of tube V1a which is in turn biased through a resistor 46a to the negative potential source 52. The anode 48 of tube V1a is connected through a load resistance 49 to a source of positive potential 50. The cathode 51 is connected to a source of negative potential 52. Anode 48 is coupled through a capacitance 53 to the control electrode 54 of V1b. Anode 55 of tube V1b is connected through an anode resistance 56 to potential source 50. Control electrode 54 and cathode 58 are connected through a resistance 57 and the parallel combination of resistance 59 and capacitance 60, respectively, to the negative potential source 52.

The input signal, which advantageously is a negative square wave pulse, is amplified by each of the triodes comprising tube V1 and appears on the anode 55 as an amplified negative pulse. This pulse then is differentiated by a differentiating circuit defined by capacitance 61 and resistance 62 and appears on the control electrode 63 of tube V2a as a sharp negative spike followed by a sharp positive spike. Cathode 64 of V2a is connected through a pair of contacts 65 of relay 66 to the upper film loop switch 22 (Fig. 1) by terminal 67. Anode 68 of tube V2a is connected to anode 104 of tube V3a and through capacitance 69 and diode 70 to anode 73 of tube V5.

The differentiated pulse controls the operation of the flash lamp through the circuit comprising tubes V5 and V6. Tube V5 is a dual triode having in section V5a a control electrode 71, a cathode 72 and an anode 73. Control electrode 71 and cathode 72 are connected to the source of negative potential 52, the cathode being connected thereto through resistance 74. Anode 73 is connected through a resistance 75 to the potential source 50. Anode 73 also is connected through capacitance 76 to the control electrode 77 of V5b. Anode 78 and control electrode 77 of V5b are connected through resistances 79 and 80, respectively, to potential source 50. Cathode 81 of tube V5b is connected directly to cathode 72 of tube V5a.

When the differentiated pulse is applied to tube V5, the diode 70 passes only the negative portion of the pulse due to its polarization. This negative spike cuts off normally conducting tube V5a, and the subsequent decrease in bias on tube V5a through common cathode 74 causes the latter to conduct. Tube V5 is a one-shot multivibrator whose period is determined by the time constants of the circuit and at the end of this period the tube returns to its normal condition of V5a conducting and V5b non-conducting.

The output is taken from the anode 73 of V5a and is applied through a differentiating circuit comprising capacitance 82 and resistance 83 to resistance 102 and grid electrode 84 of tube V6. Tube V6, which advantageously is a gas tube of the thyratron type, has its screen grid 87 and its cathode 86 tied together and connected through a resistance 85 to potential source 50. The thyratron anode 88 is connected through a resistance 89 to a positive potential source 90. Anode 88 also is connected through a capacitance 91 to the flash lamp terminal 92 and through a resistance 93 to potential source 50. A voltage dividing network comprising resistance 103 and the parallel combination of resistance 104 and capacitance 105 is connected between potential source 50 and potential source 52 to hold tube V6 normally non-conducting. In the output circuit of the thyratron V6 may be connected a number of resistance-capacitance circuits such as resistances 94, 96, 98 and 100 and capacitances 95, 97 and 99. Advantageously, a pair of switching means 101 and 106 is arranged so as to connect any combination of the foregoing resistances and capacitances, as desired. The armatures of switches 101 and 106 are connected to the flash lamp through terminal 107.

In the operation of the flash lamp triggering circuit, the differentiated output pulse from tube V5 causes the normally non-conducting thyratron V6 to fire and produce a trigger pulse to flash the flash lamp in the camera body. In accordance with an aspect of this invention, the intensity of the flash lamp can be varied by switching in more or less capacity in the circuit by the switches 101 and 106. As can be seen from the preferred embodiment illustrated in Figure 4, the circuit has been designed for five different intensities and, advantageously, the switch may be located on the front panel of the camera control unit for ease of access.

Turning now to the rate integration circuit, tube V2b, which has its cathode 211 connected to potential source terminal 212, applies a negative triggering pulse from its anode 108 to control electrode 109 of tube V4b through a capacitance 110 and a potentiometer 111, the latter being adjustable to provide a desired grid drive. Cathode 112 of tube V4b is connected to cathode 113 of tube V4a and through a common resistance 114 to potential source 52. Control electrode 115 of tube V4a also is connected to potential source 52. Anode resistances 116 and 117 connect the anodes 118 and 119 of tubes V4a and V4b, respectively, to potential source 50. A capacitance 120 is connected between anode 118 and potential source 50.

Tube V4 is a one-shot multivibrator that is triggered by the negative pulse from anode 108 of tube V2b. In its normal condition, tube V4b is conducting and tube V4a is non-conducting. The negative input pulse drives tube V4b to cut-off and the coupling action provided by common resistance 114 permits tube V4a to conduct. At the end of the multivibrator period, as determined by its time constants, tube V4b goes back into conduction, thereby increasing the bias on tube V4a and cutting it off. The negative square wave pulse which results from this operation of multivibrator V4 appears at anode 118 of tube V4a in slightly modified form due to the effect of capacitance 120. The purpose of modifying capacitance 120 is to enable the period of delay multivibrator V3 to track the varying input pulse rate, that is, to be non-linear in a manner similar to the periods of the input pulse so as to maintain the film pull-down in the blanking period of the oscilloscope. The modified negative output pulse is applied by conductor 121 to the integrator circuit comprising the resistances 122, 123 and 124 and the capacitances 125, 126 and 127. This three-stage filter integrates the modified square wave output of tube V4 and provides at its output a D.C. control voltage which has an amplitude dependent upon and determined by the input rate of the preceding control pulses. That is, due to the integrating action of the three-stage integrator circuit, a D.C. voltage is provided having an amplitude corresponding to the input pulse rate of the pulses which previously have been applied to the electronic control circuit. This D.C. voltage is one which varies inversely with the pulse rate frequency and thus changes in amplitude with every change of the input pulse rate.

This D.C. control voltage is applied to a delay multivibrator comprising tubes V3a and V3b. Tube V3a has its anode 104 connected through a resistance 128 to potential source 50, its control electrode 129 connected to the integrator network and a grid input resistance 130, and its cathode 131 connected through a resistance 132 to potential source 52. Anode 104 of tube V3a also is coupled through a capacitance 133 to the control electrode 134 of tube V3b and through a resistance 135 and a potentiometer 136 to potential source 50. Anode 137 of tube V3b is connected through a resistance 138 to potential source 50 and cathode 139 is connected to the common cathode resistance 132.

Multivibrator V3 produces an output square wave whose trailing edge is an adjustable period in advance of the next blanking pulse input signal as determined by the past history of the input pulse rate, this period advantageously being equal to the mechanical inertial delay of the solenoid. The duration of the output pulse from tube V3b is dependent upon both the setting of potentiometer 136 and the value of the D.C. control voltage input on grid 129 of tube V3a. Since the potentiometer 136 can be set at a predetermined position, the square wave output will vary with the variation of the D.C. control input voltage. Thus, to obtain the desired output from the circuit, the correct D.C. input voltage must be applied to grid 129 for any given frequency of input pulses. This output pulse then is applied from anode 104 of tube V3a to the flash lamp circuit through capacitance 69 and to the solenoid pulse unit by terminal 140.

Tubes V7 and V8 are the clutch and brake control tubes, respectively. Tube V7 has its anode 141 connected by terminal 142 to the clutch control 31 (Fig. 2). Control electrode 143 of tube V7 is connected through a resistance 144 to potential source 52. Cathode 145 is connected to potential source 50. Screen grid 146 is connected through a resistance 147 to a source of potential terminal 148.

Brake control tube V8 has its anode 149 connected by terminal 150 to the brake control 32 (Fig. 2). Screen grid 151 is connected through a resistance 152 to a source of potential terminal 153. Control grid 154 of tube V8 is connected through a resistance 155 to potential source 52. Cathode 156 is connected to potential source 50. The clutch contact of the lower loop switch 24 (Fig. 2) is connected to terminal 157 and therefrom to control grid 143 of tube V7. The brake contact of lower loop switch 24 (Fig. 2) is connected to terminal 158 and therefrom to control grid 154 of tube V8. A diode 159 has its anode 160 connected to anode 141 of tube V7 and its cathode 161 connected through resistance 147 to screen grid 146 of tube V7. Similarly, a diode 162 has its anode 163 connected to anode 149 of tube V8 and its cathode 164 connected through resistance 152 to screen grid 151 of tube V8.

In the operation of the clutch-brake drive control circuit, each of tubes V7 and V8 is biased below cut-off by the negative voltages applied to the grids 143 and 154, respectively, from potential source 52. The lower loop switch 24 grounds grid 154 of brake control tube V8 through terminal 158 when a normal size film loop exists, thereby causes tube V8 to conduct and energize the brake control mechanism connected to the anode 149 of tube V8 by terminal 150. Therefore, in this condition the brake is held on and the clutch is in its non-operative state. When the lower film loop becomes too large, the lower loop switch 17 (Fig. 1) is depressed and actuates lower loop switch 24 to ground grid 143 of the clutch control tube V7 and remove ground from grid 154 of brake control tube V8. This applies the motor drive to the sprockets 12 and 18, which are mechanically geared together, thus reducing the size of the lower loop to the normal condition. In this manner, both the upper and lower film loops are maintained despite the irregular rate of the input pulses. Diodes 159 and 162, which are connected in the circuit across the anodes and screen grids of tubes V7 and V8, respectively, act to shunt the inductive surge of the brake and clutch mechanisms 32 and 31, respectively, when they are energized.

It will be noted that the circuit of tube V2a has contacts 65 of relay 66 and the upper loop switch 22 connected to its cathode 64 through terminal 67. Relay 66 is controlled by the start-stop switch on the device through terminal 170. Thus this relay is adapted to stop the operation of the flash lamp by opening contacts 167, which in its closed condition connects an A.C. source between terminal 168 and the flash lamp terminal 169, and also to stop the pulse to the pull-down solenoid in the pulse unit by opening contacts 65. In this manner, the camera can be left in a standby condition. Upper loop switch 22 is actuated when the upper loop becomes too small and opens the cathode circuit of tube V2a to stop the pulse that energizes the solenoid, thereby eliminating the possibility of any damage to the film due to a small upper loop.

The solenoid pulse control unit and its power supply are shown in Figure 5 of the drawing. The purpose of this pulse unit is to actuate the pull-down solenoid in the camera in response to the receipt of a blanking input pulse from the oscilloscope. The negative pulse from the anode 104 of tube V3a (shown in Figure 4) is used as the input signal to the pulse unit through the terminal 140. This signal first is differentiated by the differentiating circuit comprising capacitance 175 and resistance 176 and then is applied to the control grid 177 of tube V9a.

Tubes V9a and V9b form a two-stage amplifying circuit which shape the trigger pulse to the solenoid control thyratron V10. Tube V9a has an anode 178 connected through a resistance 179 to a source of potential terminal 180 and through a capacitance 181 to grid resistance 183 and control electrode 182 of tube V9b. Cathodes 184 and 185 of tubes V9a and V9b, respectively, are connected to ground. The positive trigger pulse which appears at anode 186 and tube V9b is applied through a capacitance 187 and a resistance 188 to the control grid 189 of the thyratron V10. The junction of capacitance 187 and resistance 188 is connected through a resistance 192 and the parallel combination of potentiometer 190 and capacitance 191 to ground. A terminal of potentiometer 190 and a terminal of resistance 176 is connected to a source of negative potential 193. The thyratron V10 has its screen grid 194 and its cathode 195 connected by terminal 196 through the normally closed breaker points 36 (Fig. 2) to ground. Anode 197 of tube V10 is connected by terminal 198 to the pull-down solenoid 35 (Fig. 2).

Thyratron V10 normally is held in the cut-off condition by the negative potential appearing on potentiometer 190. When the positive output pulse is applied from tube V9b to the control electrode 189 of tube V10, the thyratron is driven into conduction and energizes the pull-down solenoid to trip the next frame advance of the film. As explained heretofore, the energization of the pull-down solenoid opens breaker points 36 connected in the cathode circuit of tube V10 to de-ionize the thyratron and prepare the pulse unit for the next input signal pulse.

The thyratron power supply shown below the pulse unit supplies the power necessary to actuate the pull-down solenoid. The primary circuit for this supply is connected from A.C. terminals 200 and 201 through a time delay relay 202 to the primary of power transformer 203. The purpose of time delay relay 202 is to allow sufficient time for the filament of the thyratron V10 to heat before the primary circuit of transformer 203 is completed. This eliminates the possibility of damage to the thyratron. The secondary of power transformer 203 is connected to a full-wave selenium rectifier bridge comprising the rectifiers 204, 205, 206 and 207. If desired, the ripple in the D.C. voltage output from this rectifier may be filtered by a capacitance 208 which also acts as an energy reservoir for the high current pulse supplied to the pull-down solenoid through terminal 209.

While this invention has been disclosed in a particular embodiment for the purposes of illustrating its principles, it will be appreciated by those skilled in the art that various modifications may be made therein to achieve the results of the invention. It will be understood that such modifications are intended to be within the spirit and scope of the appended claims.

What is claimed is:

1. A data recording camera for recording information displayed on a cathode ray oscilloscope comprising a lens, a hood attached to said lens and adapted to fit the face of said oscilloscope, a camera body including a shutterless exposing device in cooperative relation with said lens, film pull-down means for advancing film past said exposing device in response to electrical control signals from said oscilloscope comprising a solenoid and a gaseous discharge device for actuating said solenoid, said discharge device being energized in response to said control signals, sensing means responsive to loop size for maintaining the size of the film loops above and below said shutterless exposing device, and signal anticipation means for compensating for the inertial delay between the application of control signals to said solenoid and the start of film pull-down comprising an integrating network adapted to provide control voltage having characteristics determined by the repetition rate of said electrical control signals.

2. A data recording camera for recording information displayed on a cathode ray oscilloscope comprising a lens, a camera body including a shutterless exposing device in cooperative relation with said lens, film pull-down means for advancing film past said exposing device in response to electrical control signals from said oscilloscope, sensing means responsive to loop size for maintaining the size of the film loops above and below said shutterless exposing device including brake means, actuated when the lower film loop is of desired size and clutch means actuated when said lower film loop exceeds said desired size, and signal anticipation means for compensating for the inertial delay between the application of control signals to said pull-down means and the start of film pull-down comprising an integrating network adapted to provide control voltage having characteristics determined by the repetition rate of said electrical control signals.

3. A data recording camera comprising a lens, a camera body including a shutterless exposing device in cooperative relation with said lens, film pull-down means for advancing film past said shutterless exposing device in response to electrical signals having a variable repetition rate, and, sensing means responsive to loop size for maintaining the size of the film loops above and below said shutterless exposing device, and signal anticipation means for compensating for the inertial delay between the application of said electrical signals to said pull-down means and the start of film pull-down comprising an integrating network adapted to provide control voltage having characteristics determined by the repetition rate of said electrical control signals.

4. A data recording camera in accordance with claim 3 further comprising upper film loop detection means including a first switch adapted to be actuated when the upper film loop is reduced below a desired size, and a second switch responsive to the actuation of said first switch for rendering said film pull-down means inoperative to advance the film until the upper film loop is returned to said desired size.

5. A data recording camera in accordance with claim 3 further comprising a pulse forming network responsive to the amplitude characteristic of said control voltage provided by said integrating network for generating a pulse having a duration determined by said amplitude characteristic, and means to apply said last named pulse to said film pull-down means.

6. A data recording camera for recording information displayed on a cathode ray oscilloscope comprising a lens, a camera body including a shutterless exposing device in cooperative relation with said lens, film pull-down means for advancing film past said exposing device in response to electrical control signals from said oscilloscope, sensing means responsive to loop size for maintaining the size of the film loops above and below said exposing device including brake means actuated when the lower film loop is of desired size and clutch means actuated when said film pull-down means causes said lower film loop to exceed said desired size, and signal anticipation means for compensating for the inertial delay between the application of control signals to said solenoid and the start of film pull-down comprising an integrating network adapted to provide a D.C. control voltage of amplitude determined by the repetition rate of said electrical control signals.

7. A camera for recording information appearing at varying and irregular intervals comprising a lens, a camera body including a shutterless exposing device in cooperative relation with said lens, film pull-down means for advancing film past said exposing device in response to electrical pulses having a varying and irregular repetition rate in accordance with said information, sensing means responsive to loop size for maintaining the size of the film loops above and below said exposing device, and signal anticipation means for providing a signal to said film pull-down means a pre-determined period of time in advance of said electrical pulses comprising an integrating network adapted to provide a D.C. control voltage having amplitude characteristics determined by the repetition rate of said electrical pulses and a signal forming network adapted to generate a signal having a time duration related to the amplitude of said D.C. control voltage.

8. A data recording camera comprising an exposing device, pull-down means to advance film past said exposing device in response to random electrical control pulses of varying input rates, said means including a pull-down solenoid adapted to be energized in time synchronism with said control pulses, and means to compensate for mechanical inertial delay between an electrical control pulse applied to said pull-down solenoid and the operation of said pull-down means comprising an integrating network adapted to integrate said electrical control pulses to produce a D.C. voltage having an amplitude determined by the input rate thereof, a pulse forming network for providing pulses having a pulse width corresponding to the amplitude of said D.C. voltage, and means to apply said latter pulses to said pull-down means.

9. A data recording camera in accordance with claim 8 wherein said integrating network comprises a plurality of resistance capacitance filters and said pulse forming network comprises a multivibrator having its input connected to the output of said integrating networks.

10. A data recording camera comprising an exposing device, pull-down means to advance film past said exposing device in response to random electrical control pulses of varying input rates, said pull-down means including a solenoid, and means to compensate for mechanical inertial delay between an electrical control pulse applied to said solenoid and the operation of said pull-down means comprising a resistance-capacitance network for integrating said electrical control pulses to produce a D.C. voltage having an amplitude determined by the input rate thereof, and a pulse forming network connected to said resistance-capacitance network for providing pulses having a pulse-width corresponding to the amplitude of said D.C. voltage, the trailing edge of each of said latter pulses being adjustable to lead the next succeeding electrical control pulse by a desired time interval.

11. A data recording camera comprising an exposing device, film transport means to advance film past said exposing device in response to random electrical control pulses of varying input rates, said means including a gaseous discharge device and a pull-down solenoid adapted to be energized by the conducting condition thereof, and means to compensate for mechanical inertial delay between an electrical control pulse applied to said film transport means and the operation of said pull-down solenoid comprising an integrating network adapted to integrate said electrical control pulses to produce a D.C. voltage having an amplitude determined by the input rate thereof, and a pulse forming network responsive to said D.C. voltage for applying further control pulses to said film transport means a period of time equal to said inertial delay in advance of said electrical control pulses.

12. A data recording camera comprising an exposing device, pull-down means to advance film past said exposing device in response to random electrical control pulses of varying input rates, and means to compensate for mechanical inertial delay between an electrical control pulse applied to said pull-down means and the advance of said film comprising an integrating network adapted to integrate said electrical control pulses to produce a D.C. voltage having an amplitude determined by the input rate thereof, and a pulse forming network for applying pulses having a pulse width determined by the amplitude of said D.C. voltage to said pull-down means.

13. A data recording camera comprising a shutterless exposing device, pull-down means for advancing film past said exposing device in response to random electrical control pulses of varying input rates, and means to compensate for the inertial delay between an electrical control pulse applied to said pull-down means and the film advance comprising an integrating network for integrating said electrical control pulses to produce a D.C. voltage having an amplitude determined by the input rate thereof, a pulse forming network for providing pulses having a pulse width corresponding to the D.C. voltage output of said integrating network, and means to apply the last named pulses to said film pull-down means.

14. A data recording camera comprising film transport means for intermittently advancing a film through a predetermined frame distance, a source of pulses of varying and irregular frequency, electronic means connected to said source for amplifying and shaping a trigger impulse from each pulse received from said source, a normally non-conducting gaseous discharge device connected to said electronic means and adapted to be triggered into conduction by said trigger impulse, electromagnetic solenoid means connected to said gaseous discharge device and adapted to be energized by conduction therein for operating said film transport means, and normally closed contact means operatively connected to said electromagnetic solenoid means and connected in circuit with said gaseous discharge device, said contact means being opened in response to the energization of said electromagnetic solenoid means for terminating conduction in said discharge device.

15. A data recording camera comprising film transport means for intermittently advancing a film through a predetermined frame distance in response to pulses of varying and irregular frequency, means for shaping each of said pulses into a trigger impulse, a normally non-conducting discharge device adapted to be driven into conduction by said trigger impulse, electromagnetic relay means connected to said discharge device and adapted to be energized by conduction therein for operating said film transport means, and switch means operatively connected to said relay means and connected in the cathode circuit of said discharge device said means being actuated in response to the energization of said electromagnetic relay means for terminating conduction in said discharge device.

16. A data recording camera comprising means to advance film through an exposing device in response to electrical control pulses of varying input frequency, said film defining a take-up loop at said exposing device, means for maintaining said take-up loop at a desired size comprising a sprocket having means to engage said film, a motor, brake means adapted to be operated by said motor for preventing film advance by said sprocket, a clutch adapted to be operated by said motor for enabling film advance by said sprocket, a switch for completing a connection to a clutch control means when the loop is too large and for completing a connection to a brake control means when the loop is of normal size, a detector responsive to the size of said take-up loop for operating said switch in accordance therewith, and said clutch control means comprising a first discharge device and means connecting said switch to said first discharge device for causing conduction therein when said switch is operated to indicate a too large film loop and for causing a cut-off bias to be applied thereto when said switch is operated to indicate a normal size film loop.

17. A data recording camera in accordance with claim 16 wherein said brake control means comprises a second discharge device and means for connecting said switch to said second discharge device for causing conduction therein when said switch is operated to indicate a normal size film loop and for causing a cut-off bias to be applied thereto when said switch is operated to indicate a too large film loop.

18. A data recording camera in accordance with claim 17 further comprising protective means connected across each of the first and second discharge devices for shunting inductive surges caused by the energization of said brake and clutch means.

19. A data recording camera in accordance with claim 18 wherein said protective means comprises a pair of diodes.

References Cited in the file of this patent

UNITED STATES PATENTS

| | | |
|---|---|---|
| 2,477,848 | Borek et al. | Aug. 2, 1949 |
| 2,558,669 | Breen | June 26, 1951 |
| 2,575,203 | Wolfner | Nov. 13, 1951 |
| 2,699,702 | Cuber | Jan. 18, 1955 |
| 2,716,154 | Raibourn | Aug. 23, 1955 |
| 2,754,721 | Grass | July 17, 1956 |